US006940710B1

(12) United States Patent
Lee et al.

(10) Patent No.: US 6,940,710 B1
(45) Date of Patent: Sep. 6, 2005

(54) MULTILAYERED CHIP CAPACITOR

(75) Inventors: Byoung Hwa Lee, Kyungki-do (KR); Dong Seok Park, Seoul (KR); Chang Hoon Shim, Kyungki-do (KR); Sang Soo Park, Kyungki-do (KR); Min Cheol Park, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/029,677

(22) Filed: Jan. 6, 2005

(30) Foreign Application Priority Data

Sep. 8, 2004 (KR) .................. 10-2004-0071615

(51) Int. Cl.[7] ............................................ H01G 4/06
(52) U.S. Cl. ............. 361/321.2; 361/303; 361/306.1; 361/306.3; 361/308.1; 361/311; 361/313
(58) Field of Search ................ 361/321.2, 321.1, 361/321.5, 303, 306.1, 306.3, 308.1, 311, 361/313, 309, 312, 301.4

(56) References Cited

U.S. PATENT DOCUMENTS 5,880,925 A    3/1999   DuPré et al.
6,266,229 B1 *  7/2001  Naito et al. .............. 361/306.3
6,370,013 B1 *  4/2002  Iino et al. ................. 361/306.3
6,407,906 B1 *  6/2002  Ahiko et al. ............. 361/306.1
6,765,781 B2 *  7/2004  Togashi .................... 361/306.3
6,807,047 B2 * 10/2004  Togashi et al. .......... 361/321.2

FOREIGN PATENT DOCUMENTS

JP          2002 164256       6/2002

* cited by examiner

Primary Examiner—Dean A. Reichard
Assistant Examiner—Nguyen T. Ha
(74) Attorney, Agent, or Firm—Lowe Hauptman & Berner, LLP

(57) ABSTRACT

A multilayered chip capacitor including a capacitor main body including a plurality of dielectric layers, which are laminated; at least one pair of first and second internal electrodes, each of which is formed on the corresponding one of the plural dielectric layers and includes at least one lead extended to one end of the corresponding dielectric layer; a plurality of external terminals formed on the outer surface of the capacitor main body, and respectively connected to the first and second internal electrodes through the leads; and at least one opened region, formed through the inner area of each of the first and second internal electrodes, for branching the flow of current so as to increase the offset quantity of parasitic inductances between the first and second internal electrodes.

14 Claims, 10 Drawing Sheets

MULTILAYERED CHIP CAPACITOR

RELATED APPLICATIONS

The present application is based on, and claims priority from, Korean Application No. 2004-71615, filed on Sep. 8, 2004, the disclosure of which is incorporated by reference herein in its entirety.

BACKGROUND OF THE INVENTION

1. Field of the Invention

The present invention relates to a multilayered chip capacitor, and more particularly to a multilayered chip capacitor having a low equivalent series inductance (ESL), which is properly used as a decoupling capacitor in a high frequency circuit.

2. Description of the Related Art

Generally, a multilayered chip capacitor (MLCC) has a structure such that internal electrodes are inserted between a plurality of dielectric layers. Such a multilayered chip capacitor has a small size and a high capacity, and is easily mounted, thus being widely used as a component of various electronic devices. Particularly, the multilayered chip capacitor serves as a decoupling capacitor, which is electrically connected between a semiconductor chip and a power source in a power circuit, such as an LSI.

In order to suppress sudden variation in current and stabilize the power circuit, the multilayered chip capacitor, serving as the decoupling capacitor, requires a low equivalent series inductance (ESL). The above requirement is increased so as to satisfy high-frequency and high-current trends of recent electronic devices.

In order to lower the ESL, there was proposed a method employing a novel arrangement of leads, which is disclosed by U.S. Pat. No. 5,880,925. FIGS. 1a and 1b illustrate a multilayered chip capacitor, in which leads of first and second internal electrodes having different polarities are alternately arranged.

With reference to FIG. 1a, internal electrodes 12 and 13 are respectively formed on a plurality of dielectric layers 11a to 11h. The internal electrodes are divided into first internal electrodes 12 and second internal electrodes 13, and two leads 14 and 15 are formed on each of opposite two sides of the first and second internal electrodes 12 and 13. The dielectric layers 11a to 11h including the first and second internal electrodes 12 and 13 as shown in FIG. 1a are laminated to form a capacitor main body 11, and external terminals 16 and 17 connected to the leads 14 and 15 are formed on the capacitor main body 11, thereby producing a multilayered chip capacitor 10 as shown in FIG. 1b.

Here, since the leads 14 of the first internal electrodes 12 alternate with the leads 15 of the second internal electrodes 13, the directions of current flowing along the neighboring internal electrodes 12 and 13 are opposite to each other. Parasitic inductance generated from one of the first and second internal electrodes 12 and 13 is partially offset against parasitic inductance generated from the neighboring the other one of the first and second internal electrodes 12 and 13, thereby achieving low ESL characteristics.

However, the above-described multilayered chip capacitor cannot have sufficient ESL reduction effects. That is, since the leads 14 and 15 are alternately disposed, parts of the inductances are opposite to each other. Further, since inner areas of the first and second internal electrodes 12 and 13, which are not close to the leads 14 and 15, do not have a constant flow of current, but have a random flow of current, it is difficult to offset a large quantity of the inductances.

In view of the above problems, there was proposed a method for deforming shapes of internal electrodes. Japanese Patent Laid-open No. 2002-164256 discloses structures of internal electrodes as shown in FIG. 2. FIG. 2 illustrates first and second internal electrodes 22 and 23 connected to different polarities.

Two dielectric layers 21a and 21b as shown in FIG. 2 are laminated to form a part of a capacitor main body. The first internal electrode 22, in which current flows in a clockwise direction, is formed on one dielectric layer 21a, and the second internal electrode 23, in which current flows in a counterclockwise direction, is formed on the other dielectric layer 21b. Here, the first and second internal electrodes 22 and 23 have opposite directions of current, thereby reducing ESL.

However, since the leads 24 and 25 are disposed at different positions in the above method for deforming the structures of the internal electrodes, the first and second internal electrodes 22 and 23 have different shapes. Accordingly, it is difficult to properly design internal electrodes of a multilayered chip capacitor based on desirable characteristics of the capacitor. Further, the first and second internal electrodes 22 and 23, which have complicated linear shapes, increase difference of inductance characteristics due to mismatching of the first and second internal electrodes 22 and 23 in a laminating process.

SUMMARY OF THE INVENTION

Therefore, the present invention has been made in view of the above problems, and it is an object of the present invention to provide a multilayered chip capacitor, in which opened regions having simple shapes are formed in internal electrode areas so that current routes are precisely defined, thereby reducing ESL and being advantageous in terms of a design and a manufacturing process.

In accordance with the present invention, the above and other objects can be accomplished by the provision of a multilayered chip capacitor comprising: a capacitor main body including a plurality of dielectric layers, which are laminated; at least one pair of first and second internal electrodes, each of which is formed on the corresponding one of the plural dielectric layers and includes at least one lead extended to one end of the corresponding dielectric layer; a plurality of external terminals formed on the outer surface of the capacitor main body, and respectively connected to the first and second internal electrodes through the leads; and at least one opened region, formed through the inner area of each of the first and second internal electrodes, for branching the flow of current so as to increase the offset quantity of parasitic inductances between the first and second internal electrodes.

Each of the first and second internal electrodes may include a plurality of the leads arranged on each of opposite two sides thereof in the same number so that the leads of the first internal electrodes alternate with the leads of the second internal electrodes; and each of the first and second internal electrodes includes a plurality of the opened regions.

Preferably, the plural opened regions may be arranged on each of the opposite two sides of the first and second internal electrodes in the same number. More preferably, the opened regions may be arranged in parallel with the opposite two sides of the first and second internal electrodes.

At least one of the plural opened regions or all of the plural opened regions may be extended from a position close to one of the opposite two sides to a position close to the other one of the opposite two sides.

Preferably, the direction of the flow of current and the quantity of current, branched by the opened regions of the first internal electrodes, may be the same as those of the opened regions of the second internal electrodes. More preferably, the opened regions formed through the first and second internal electrodes may have the same sizes and be arranged in the same positions so that the opened regions of the first and second internal electrodes are overlapped.

The present invention may be applied to a multilayered chip capacitor having other arrangements of terminals. That is, the first and second internal electrodes may be applied to a ten-terminal multilayered chip capacitor or a twelve-terminal multilayered chip capacitor, which further includes at least one lead arranged on one of the other opposite two sides thereof. In this case, additional opened regions may be formed adjacent to the lead arranged on one of the other opposite two sides of the first and second internal electrodes.

The opened regions, formed in the inner areas of the first and second internal electrodes adjacent to the leads, may have various shapes and arrangements. For example, the plural opened regions may have the same shape and size. More particularly, the plural opened regions may have rectangular or triangular shapes.

In case that a plurality of the triangular opened regions are arranged in parallel with one side of the first and second internal electrodes, the triangular opened regions may have various arrangements. For example, the triangular opened regions may be arranged such that apexes of at least one or all of the opened regions face the sides of the first and second internal electrodes, on which the leads are formed.

Differently, in order to maximize the offset quantity of parasitic inductances due to the flow of current, the opened regions, apexes of which face the sides of the first and second internal electrodes, on which the leads are formed, and the opened regions, sides of which are parallel with the sides of the first and second internal electrodes, on which the leads are formed, may be alternately arranged.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 3A:
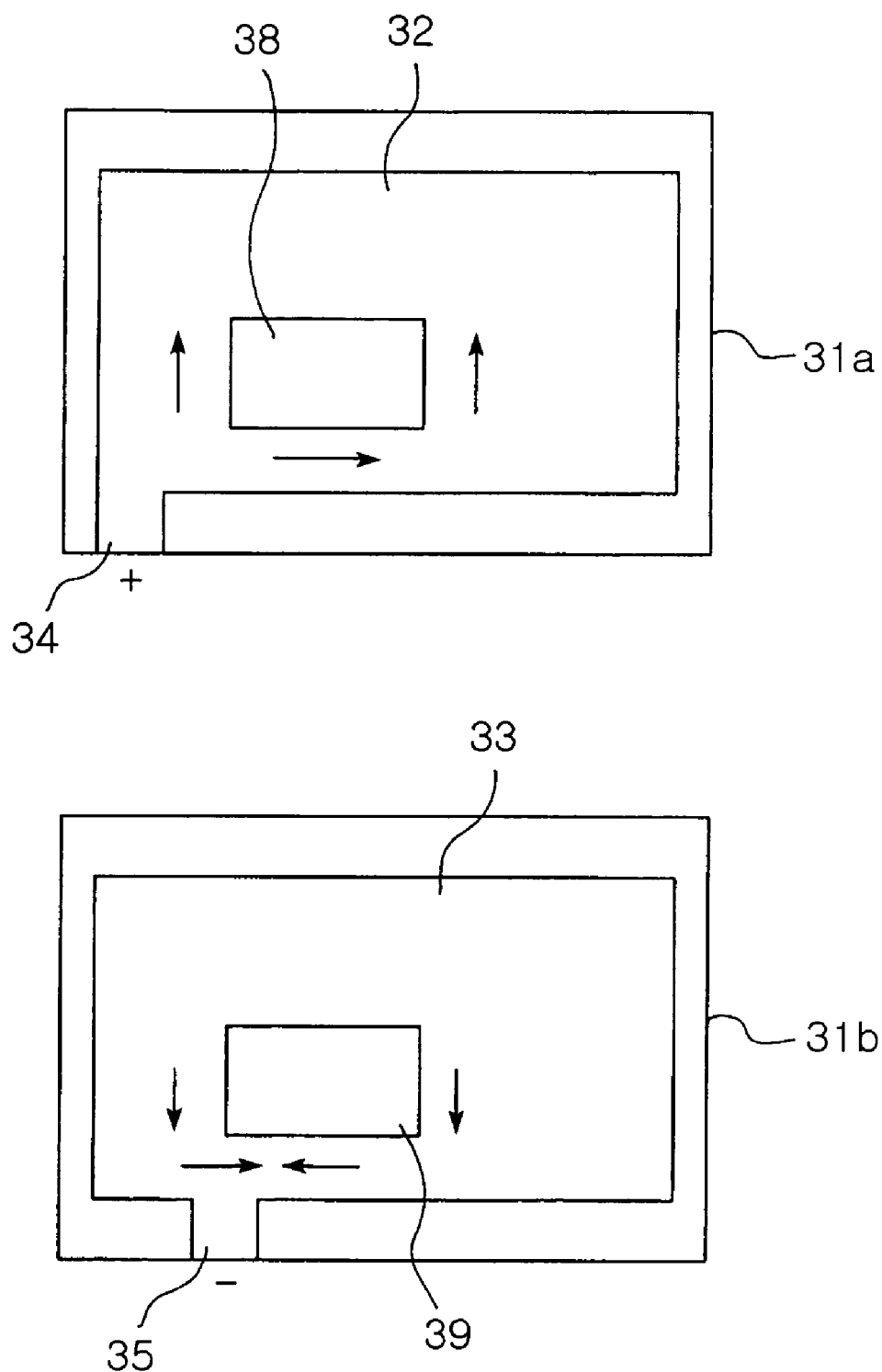
FIGS. 3a and 3b are plan views of first and second internal electrodes employed by a multilayered chip capacitor in accordance with the present invention.
Figure 3B:
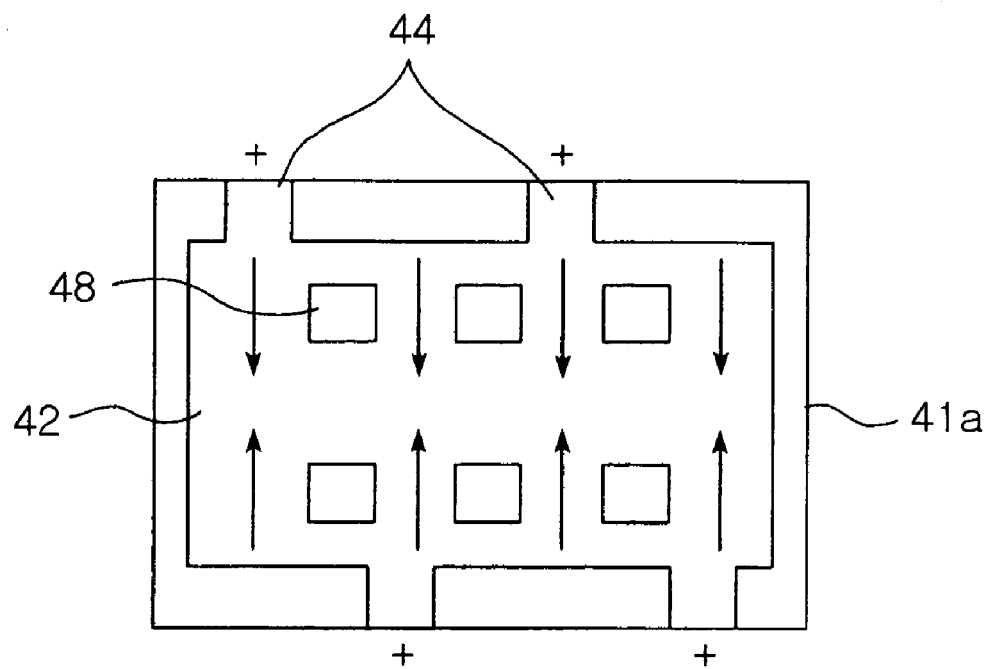
Figure 3B:
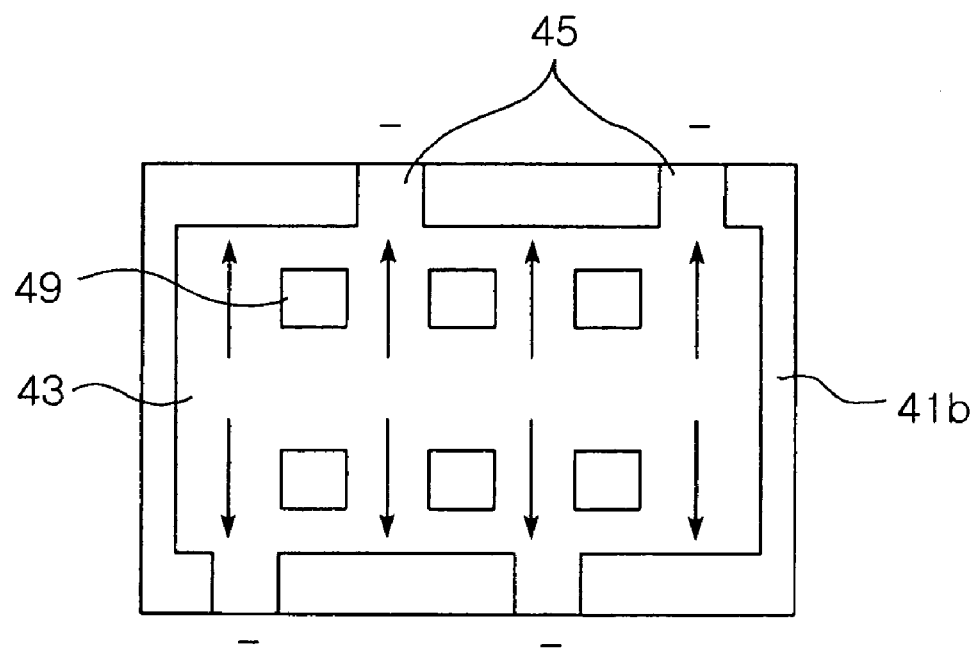

FIGS. 3a and 3b are plan views of first and second internal electrodes 32 and 33 employed by a multilayered chip capacitor in accordance with the present invention.

With reference to FIG. 3a, the first and second internal electrodes 32 and 33 are respectively formed on two dielectric layers 31a and 31b. Here, the dielectric layers 31a and 31b are neighboring two dielectric layers of a plurality of dielectric layers constituting a main body of the multilayered chip capacitor in accordance with a preferred embodiment of the present invention.

As shown in FIG. 3a, the first internal electrode 32 formed on one dielectric layer 31a includes a lead 34 extended from one side thereof, and the second internal electrode 33 formed on the other dielectric layer 31b includes a lead 35 extended from one side surface thereof facing the side surface of the first internal electrode 32 so that the lead 35 is located at a position separated from the position of the lead 34.

The first and second internal electrodes 32 and 33 respectively include opened regions 38 and 39 formed through inner areas adjacent to the leads 34 and 35. The opened regions 38 and 39 are located at positions adjacent to the leads 34 and 35, and serve to divide current, flowing from the lead 34 or to the lead 35, into two portions.

As described above, the multilayered chip capacitor of the present invention comprises the opened regions 38 and 39 formed in the inner areas of the first and second internal electrodes 32 and 33 having-random distribution of a current flow, and defines precise directions of, the current, thereby increasing an offset quantity of parasitic inductance between the first and second internal electrodes 32 and 33. Accordingly, the multilayered chip capacitor of the present invention has low ESL characteristics, which are proper to a decoupling capacitor.

Since the opened regions 38 and 39 do not change structures of the internal electrodes 32 and 33 (defined in fence shapes), the multilayered chip capacitor of the present invention easily sets electrostatic capacity and is easily manufactured compared to the conventional multilayered chip capacitor having changed structures of internal electrodes.

FIG. 3b illustrates first and second internal electrodes 42 and 43 employed by a multilayered chip capacitor in accordance with a preferred embodiment of the present invention.

Figure 1A:
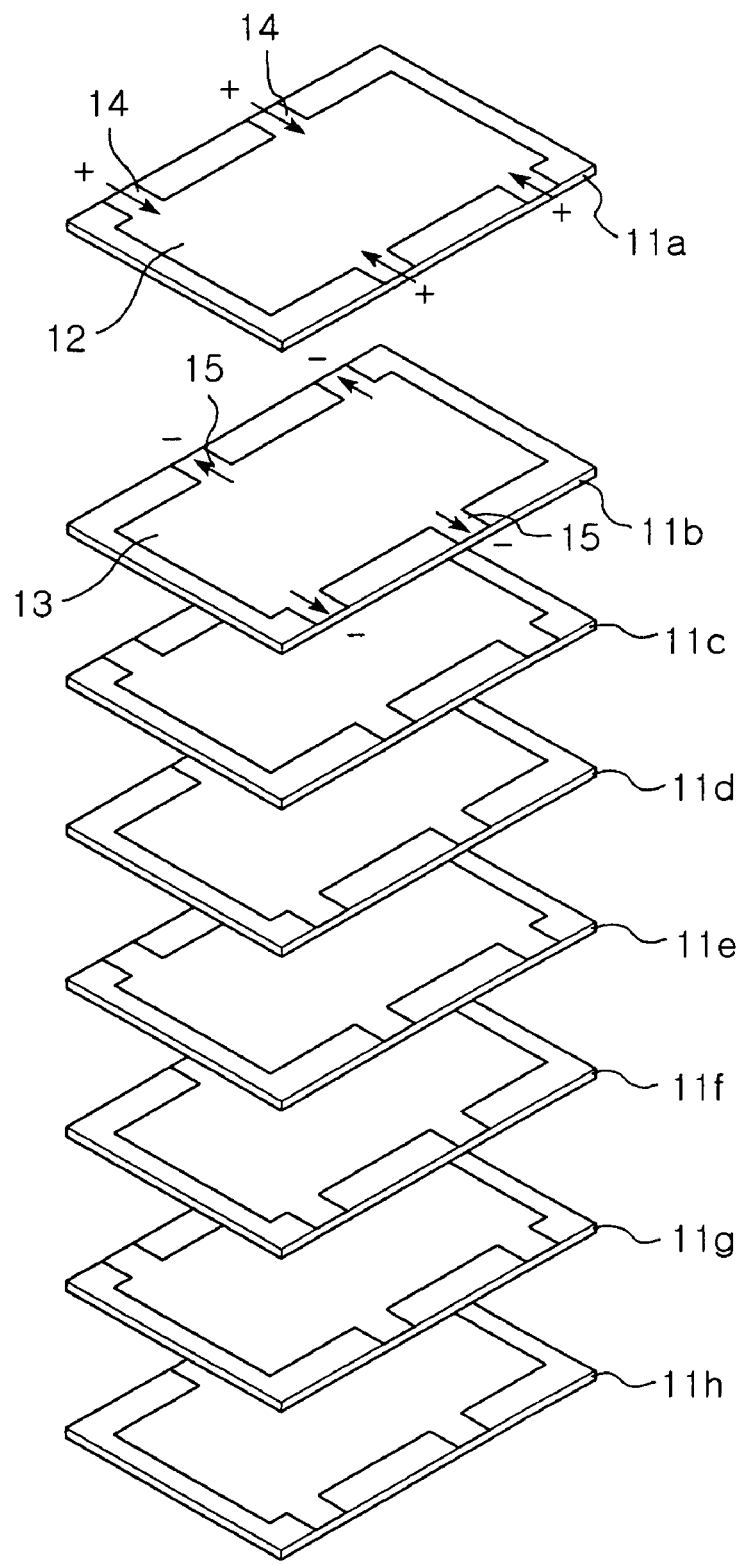
FIGS. 1a and 1b are respectively exploded and assembled perspective views of a conventional multilayered chip capacitor.
Figure 1B:
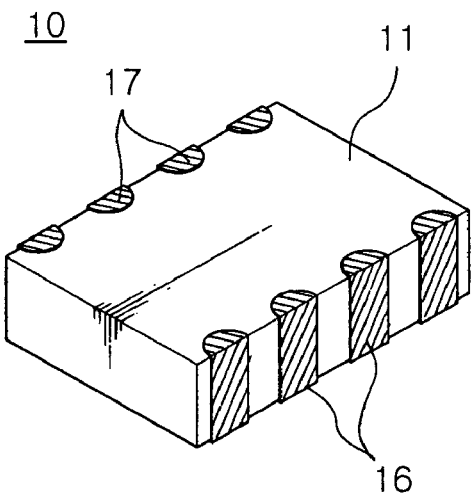

The first and second internal electrodes 42 and 43 shown in FIG. 3b have a lead structure, which is used by an eight-terminal multilayered chip capacitor similar to the multilayered chip capacitor 10 of FIG. 1a.

As shown in FIG. 3b, the first and second internal electrodes 42 and 43 formed on neighboring two dielectric layers 41a and 41b respectively include four leads 44 and 45 extended from both sides opposite to each other, and the leads 44 or 45 of one internal electrode and the leads 45 or 44 of the other internal electrode are alternately disposed such that they are separated from each other. The first internal electrode 42, formed on one dielectric layer 41a, and the second internal electrode 43, formed on the neighboring dielectric layer 41b, are respectively connected to different polarities through the leads 44 and 45.

In this embodiment, six opened regions 48 and 49 are formed inner areas of the first and second internal electrodes 42 and 43 neighboring to the leads 44 and 45. That is, three opened regions 48 and 49 are formed along each of both opposite sides of the internal electrodes 44 and 45. The opened regions 48 and 49 are arranged along the sides, on which the leads 44 and 45 are formed, on the areas close to the leads 44 and 45, thereby dividing current, flowing from the leads 44 or to the leads 45, into portions in four directions (represented by the arrows). As described above, the precisely defined flows of current offset a large quantity of parasitic inductances generated from the first and second internal electrodes 42 and 43.

In order to further improve the offset effects of parasitic inductances, preferably, the directions of current flowing along the first and second internal electrodes 42 and 43 are opposite to each other, and the quantity of current flowing along each of the opened regions of the first and second internal electrodes 42 and 43 (defined based on the width of the electrode and the distance between the leads) are approximately the same. In case that the opened regions 48 and 49 have rectangular shapes as illustrated in this embodiment, the opened regions 48 and 49 have the same size and are prepared in the same number, the opened regions 48 and 49 corresponding to each other are formed at the same positions of the first and second internal electrodes 42 and 43 so that the corresponding opened regions 48 and 49 of the first and second internal electrodes 42 and 43 are almost completely overlapped.

Figure 5B:
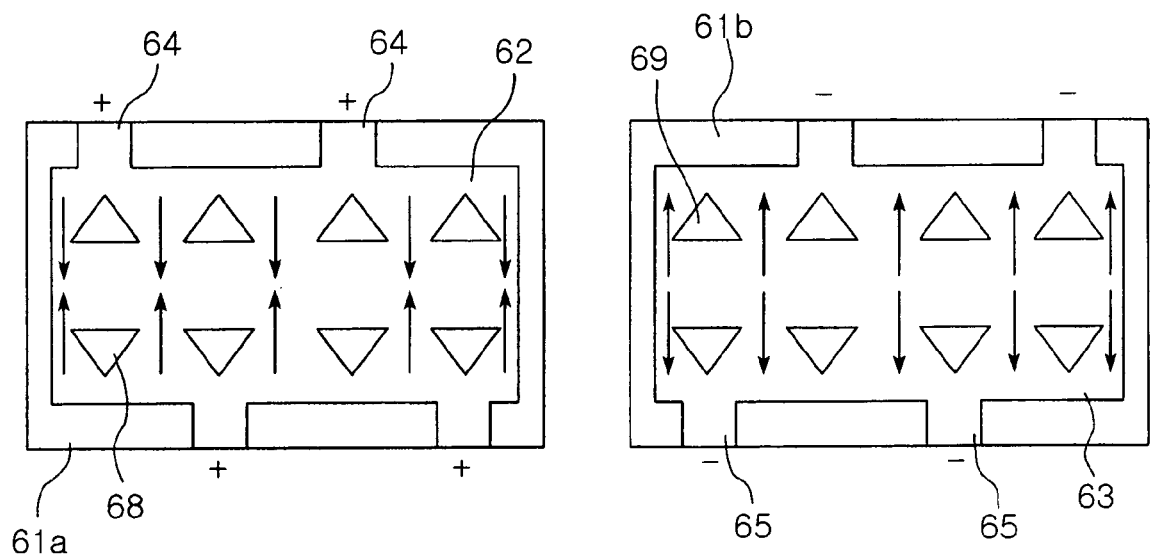
FIGS. 5a to 5e are plan views of first and second internal electrodes employed by a multilayered chip capacitor in accordance with another embodiment of the present invention.

However, the internal electrodes are not limited to the above arrangement of the opened regions. That is, in order to maximize the effects of ESL reduction, the opened regions cause the divided flows of the current of the internal electrode of one dielectric layer to correspond to the divided flows of the current of the internal electrode of the neighboring dielectric layer. Thus, in case that the internal electrodes have other shapes of the opened regions, other arrangements of the opened regions may be selected. For example, in case that the internal electrodes have opened regions in triangular shapes, an arrangement of the opened regions shown in FIG. 5c is selected. This arrangement will be described later.

Figure 4A:
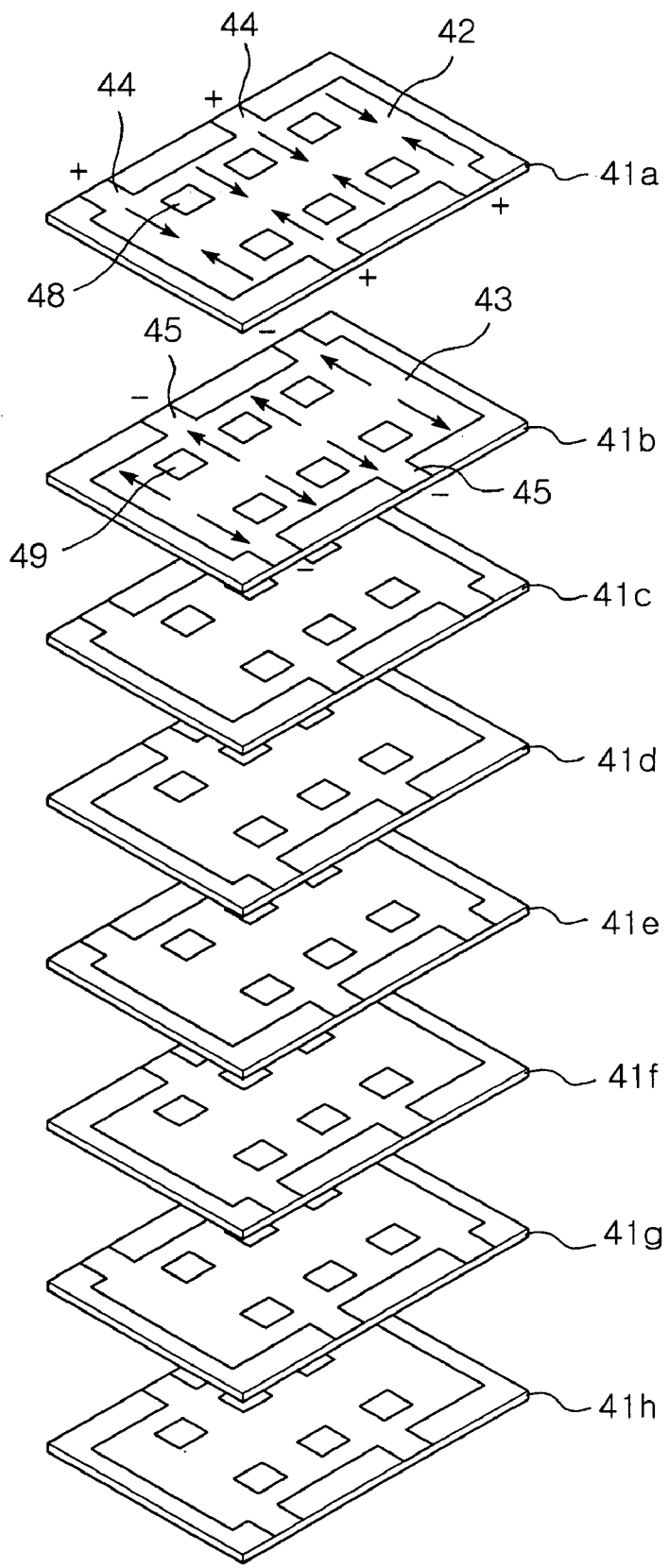
FIGS. 4a and 4b are respectively exploded and assembled perspective views of a multilayered chip capacitor in accordance with one embodiment of the present invention.
Figure 4B:
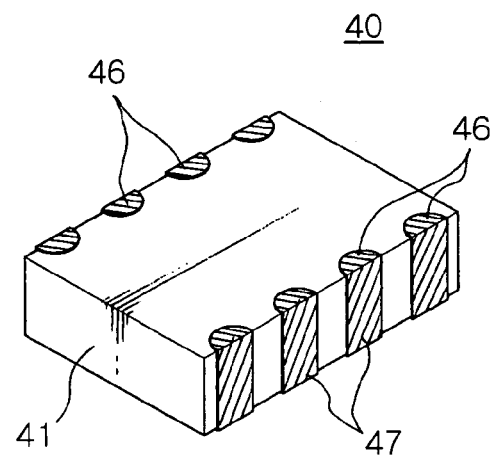

FIGS. 4a and 4b are respectively exploded and assembled perspective views of a multilayered chip capacitor, employing the structure of the internal electrodes shown in FIG. 3b, in accordance with one embodiment of the present invention.

As shown in FIG. 4a, the first and second internal electrodes 42 and 43 are respectively formed on eight dielectric layers 41a to 41h. The first and second internal electrodes 42 and 43 are alternately disposed on the eight dielectric layers 41a to 41h, and two leads 44 and 45 are respectively formed on opposite two sides of the first and second internal electrodes 42 and 43. Further, as shown in FIG. 3b, the three opened regions 48 and 49 are formed along each of the sides of the internal electrodes 44 and 45, on which the leads 44 and 45 are formed. The opened regions 48 and 49 formed on the first and second internal electrodes 42 and 43 have the same rectangular shape, and are arranged at the same positions so that the opened regions 48 and 49 formed on the neighboring two internal electrodes 42 and 43 are overlapped.

Figure 2:
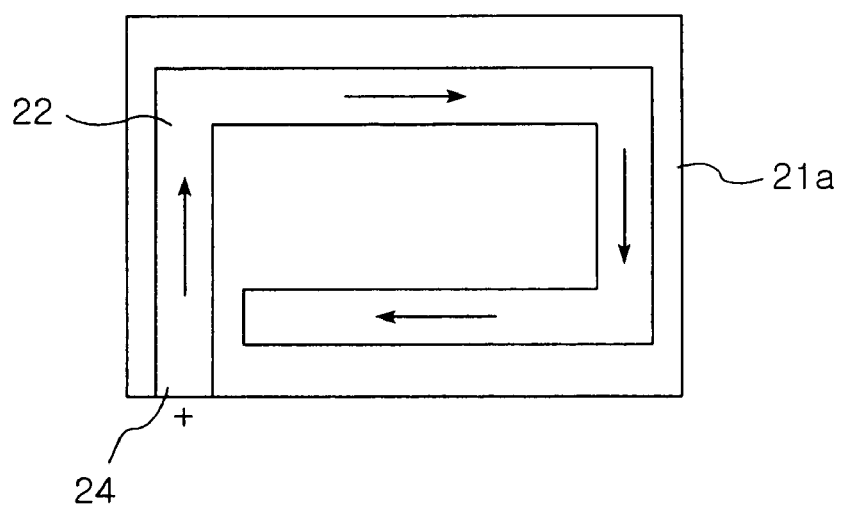
FIG. 2 is a plan view of first and second internal electrodes employed by another conventional multilayered chip capacitor.
Figure 2:
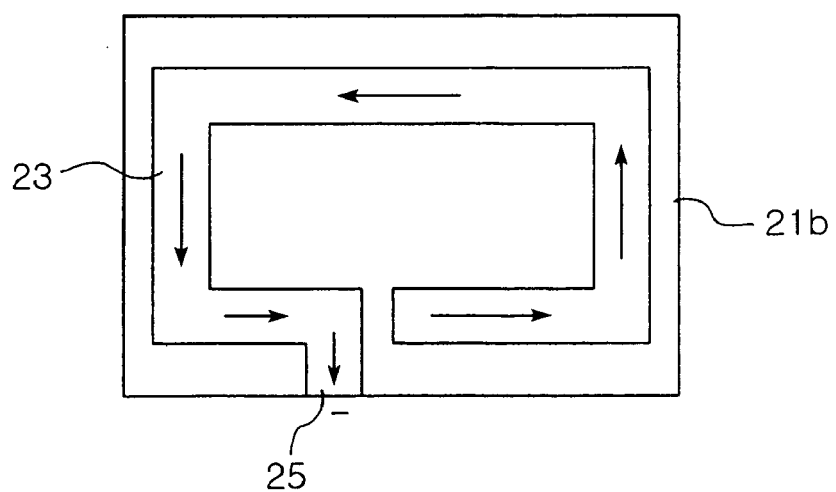

The opened regions employed for reducing the ESL cause the variation of electrostatic capacity of the multilayered chip capacitor to be more precisely estimated, thereby allowing the multilayered chip capacitor to be more easily designed. In the conventional arrangement of the internal electrodes (with reference to FIG. 2), the internal electrodes have different structures based on the positions of the leads, so that parts of the neighboring internal electrodes are not overlapped, thereby causing a difficulty of precisely designing the internal electrodes based on a designated electrostatic capacity. Further, in the conventional arrangement, the internal electrodes have linear shapes, thereby causing mismatching between the internal electrodes of the dielectric layers, thus causing several problems in a manufacturing process. The arrangement of the internal electrodes of the present invention employs the opened regions 48 and 49, which maintain essential structures of the electrodes and have simple shapes, Obtains a facility in designing and manufacturing the multilayered chip capacitor and reduces ESL characteristics.

The dielectric layers 41a to 41h, on which the internal electrodes 42 and 43 as shown in FIG. 4a are formed, are laminated to form a capacitor main body 41, and external terminals 46 and 47 are connected to the leads 48 and 49, thereby producing a multilayered chip capacitor 40 having low ESL characteristics as shown in FIG. 4b.

As described above, the opened regions employed by the present invention have several advantages, and serve as means for reducing ESL. These opened regions are prepared in various shapes, numbers, and arrangements in order to maximize the offset effects of the directions of the divided current flows on inductance.

For example, the opened regions have triangular shapes (including regular triangular shapes and right-angled triangular shapes), rectangular shapes (including perfect squares and regular squares), or other polygonal shapes, and are prepared in the same number as that of the leads, or in a number larger than that of the leads. Further, the opened regions are disposed in various arrangements.

Hereinafter, with reference to FIGS. 5a to 5e, various arrangements of the opened regions employed by the present invention will be described in detail.

Figure 5A:
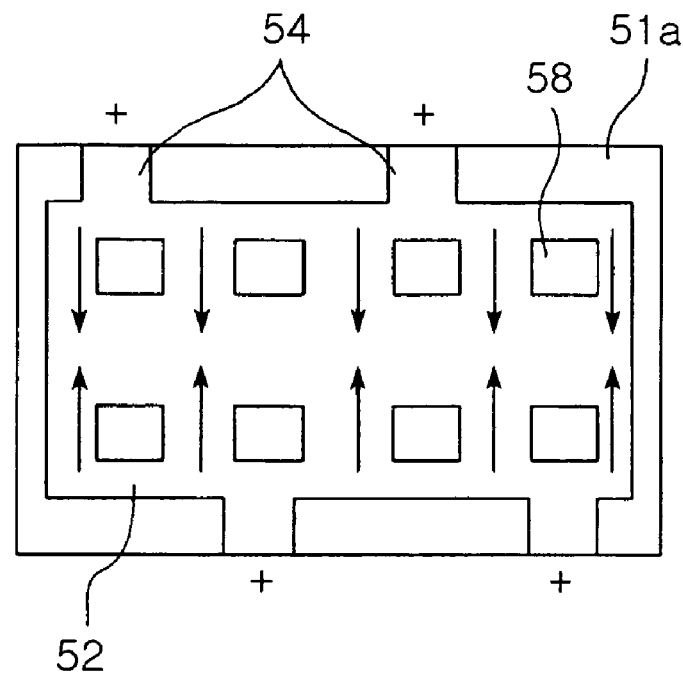
Figure 5A:
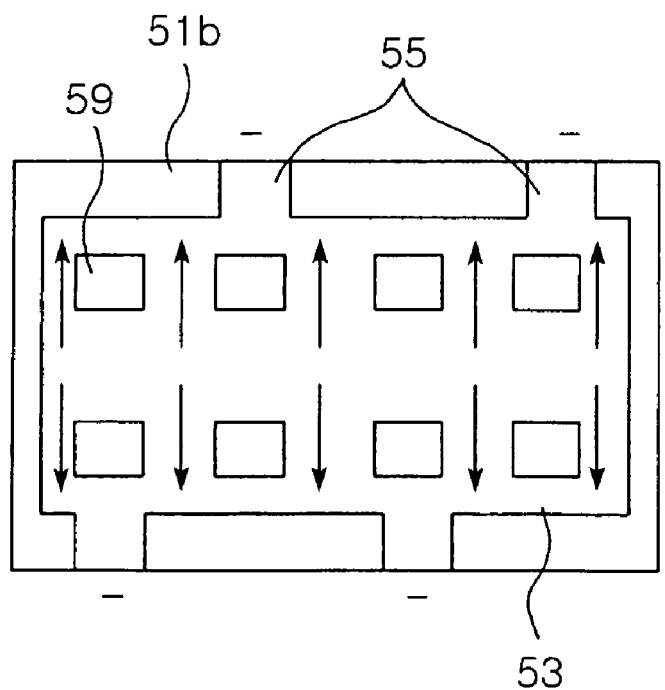
Figure 5C:
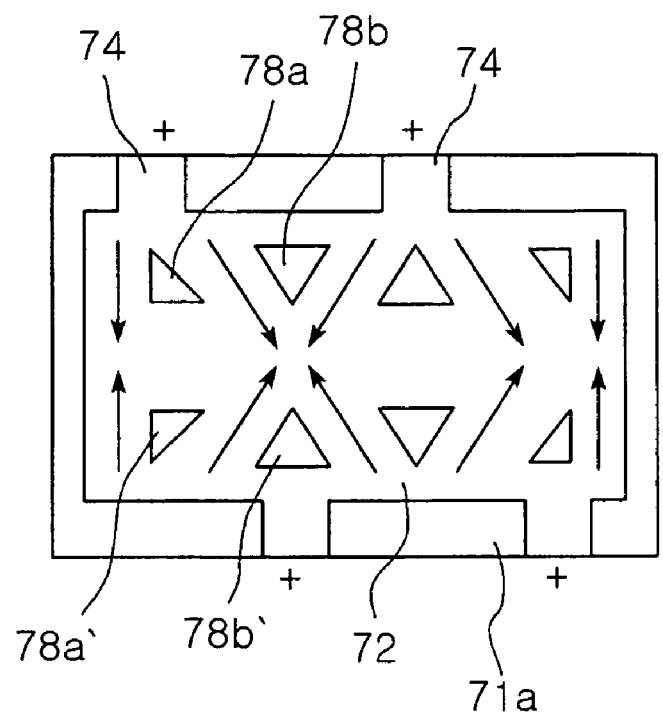
Figure 5C:
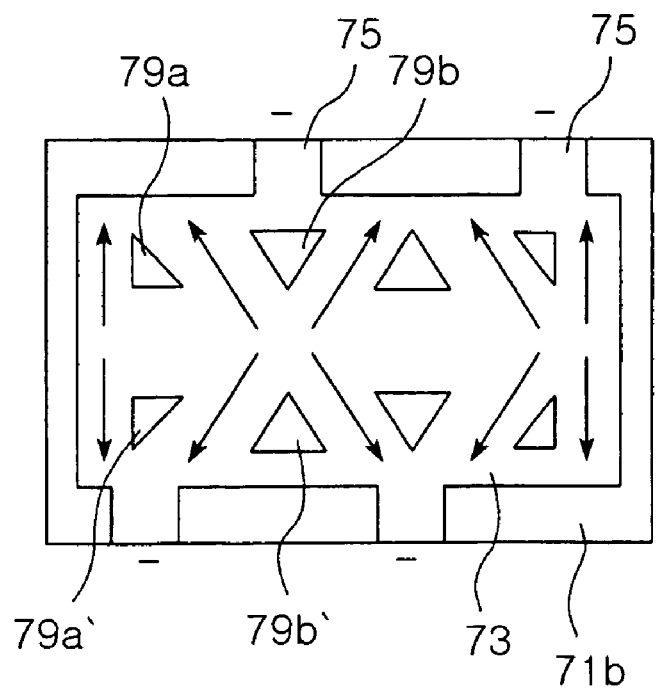

First, with reference to FIG. 5a, first and second internal electrodes 52 and 53, which are connected to different polarities, are formed on two neighboring dielectric layers 51a and 51b. Two leads 54 and 55 are formed on each of two opposite sides of the first and second internal electrodes 52 and 53.

Opened regions 58 and 59 formed through the first and second internal electrodes 52 and 53 have rectangular shapes similar to the shapes of the opened regions 48 and 49 as shown in FIG. 3b. Here, four opened regions 58 and 59 are formed along each of the sides, on which the leads 54 and 55 are formed. The above arrangement of the opened regions 58 and 59 precisely divides the flow of current on the first and second internal electrodes 51a and 51b into five portions as shown in the arrows.

The number of the opened regions 58 and 59 is properly selected in consideration of the dimensions of the internal electrodes. Preferably, in order to sufficiently reduce the inductance, the opened regions 58 and 59 are prepared at least in the same number as that of the leads, and placed close to the corresponding leads.

Differently from the above shapes of the opened regions, the multilayered chip capacitor of the present invention may employ opened regions having other shape s. For example, as shown in FIGS. 5b to 5d, the multilayered chip capacitor employs triangular opened regions.

With reference to FIG. 5b, first and second internal electrodes 62 and 63 are formed on two neighboring dielectric layer 61a and 61b similar to the dielectric layers 51a and 51b. Two leads 64 and 65 are formed on each of two opposite sides of the first and second internal electrodes 62 and 63, and the first and second internal electrodes 62 and 63 are connected to different polarities through the leads 64 and 65.

Opened regions 68 and 69 having triangular shapes are formed through the first and second internal electrodes 62 and 63. Here, four opened regions 68 and 69 are formed along each of the sides, on which the leads 64 and 65 are formed, and are arranged in the same direction. That is, apexes of all of the opened regions 68 and 69 face the sides of the first and second internal electrodes 62 and 63, on which the leads 64 and 65 are formed.

Figure 5D:
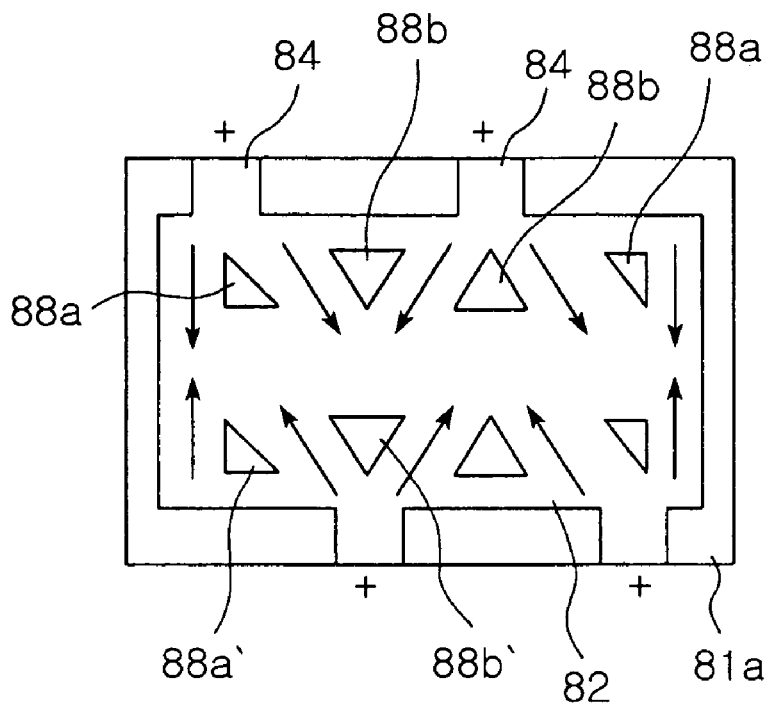
Figure 5D:
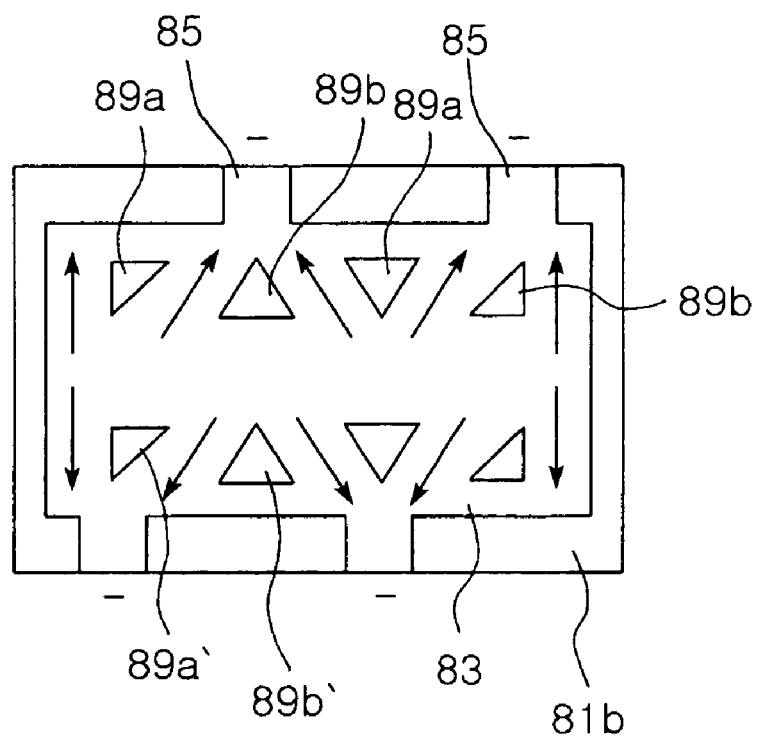

Opened regions as shown in FIGS. 5c and 5d, which will be descried hereinafter, have the same triangular shapes as those of the opened regions of the FIG. 5b, but are prepared in arrangements differing from the arrangement of the triangular opened regions of FIG. 5b.

With reference to FIG. 5c, the flow of current differing from that of FIG. 5b, is formed on first and second internal electrodes 72 and 73 formed on neighboring two dielectric layers 71a and 71b. For the reason, first opened regions 78a, 78a', 79a, and 79a', apexes of which face sides of the first and second internal electrodes 72 and 73, on which leads 74 and 75 are formed, and second opened regions 78b, 78b', 79b, and 79b', sides of which are parallel with the sides of the first and second internal electrodes 72 and 73, on which the leads 74 and 75 are formed, are alternately arranged. In this embodiment, the arrangement of the first and second opened regions 78a, 78b, 79a, and 79b along one side is symmetrical with the arrangement of the first and second opened regions 78a', 78b', 79a', and 79b' along the other side around a central line, thereby inducing the current flow as shown by the arrows in FIG. 5c.

With reference to FIG. 5d, opened regions 88a, 88b, 89a, and 89b have the same triangular shapes as those of the opened regions 78a, 78a', 79a, and 79a', and 78b, 78b', 79b, and 79b' as shown in FIG. 5c, but a current flow differing from that of FIG. 5c is formed on first and second internal electrodes 82 and 83. More particularly, first opened regions 88a, 88b', 89a', and 89b, apexes of which face sides of the first and second internal electrodes 82 and 83, on which leads 84 and 85 are formed, and second opened regions 88a', 88b, 89a, and 89b', sides of which are parallel with the sides of the first and second internal electrodes 82 and 83, on which the leads 84 and 85 are formed, are alternately arranged. However, in this embodiment, the arrangement of the first and second opened regions 88a, 88b, 89a, and 89b along one side is the same as the arrangement of the first and second opened regions 88a', 88b', 89a', and 89b' along the other side, thereby inducing the current flow as shown by the arrows in FIG. 5d.

Although the above preferred embodiments illustrate the opened regions of the first and second internal electrodes formed on the dielectric layers of the multilayered chip capacitor, which have triangular shapes or rectangular shapes, the shapes of the opened regions of the first and second internal electrodes formed on the dielectric layers of the multilayered chip capacitor of the present invention are not limited thereto. Although the opened regions of the internal electrodes have other polygonal shapes in order to precisely define the current flow, it is possible to increase the offset quantity of the parasitic inductances between the first and second internal electrodes. However, preferably, in order to increase the offset quantity of the parasitic inductances between the first and second internal electrodes, the shapes, sizes and arrangements of the opened regions of the first internal electrodes are the same as those of the opened regions of the second internal electrodes.

In the above-described embodiments, the opened regions are formed in each of opposite two sides of the first and second internal electrodes, on which the leads are formed. Differing from the above embodiments, opened regions, each of which is extended and formed at a position between opposite two sides of the first and second internal electrodes, have ESL reduction effects.

Figure 5E:
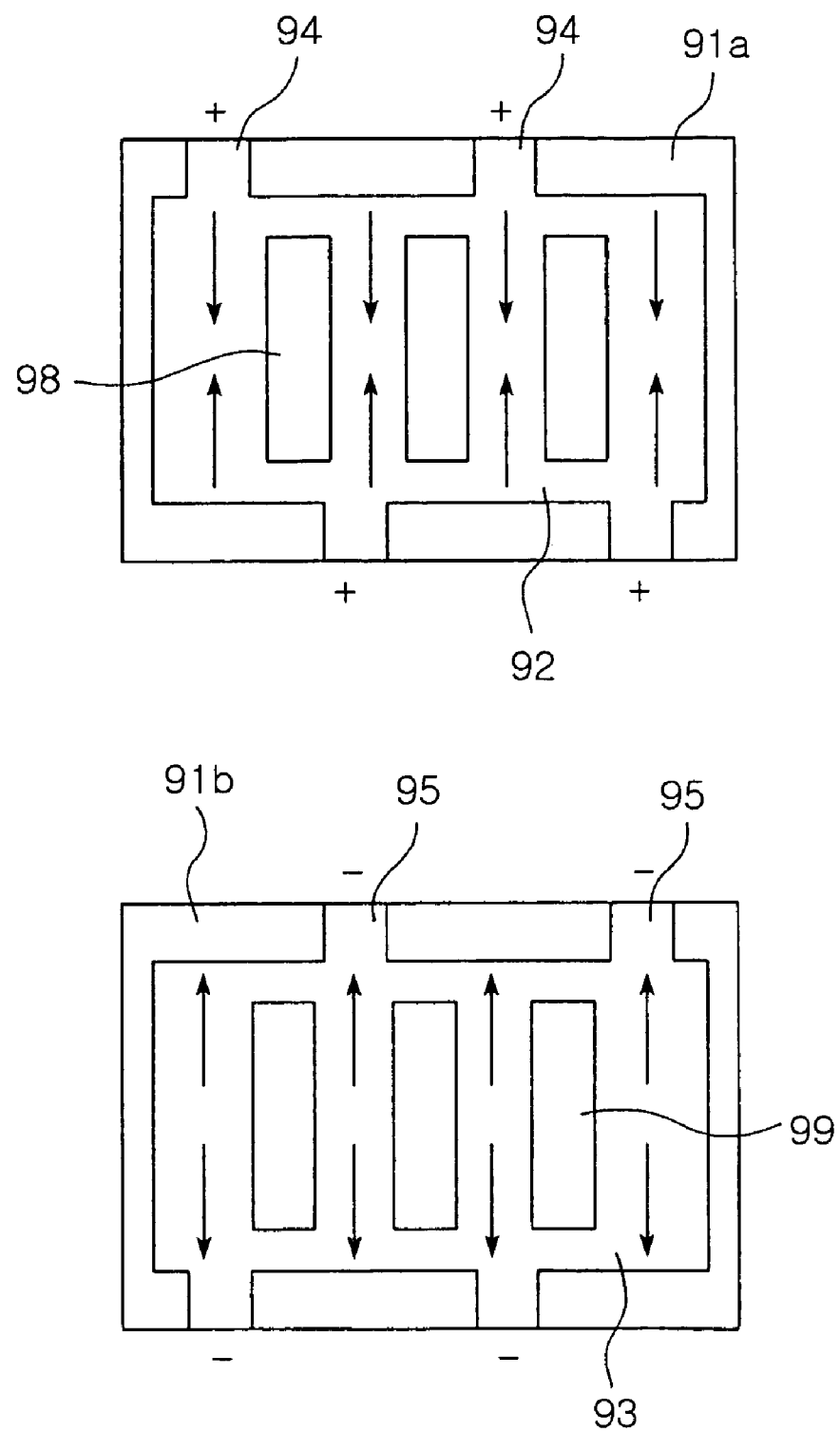

With reference to FIG. 5e, first and second internal electrodes 92 and 93 having a similar structure to those of the first and second internal electrodes of the preceding embodiments are formed on neighboring dielectric layers 91a and 91b. Three opened regions 98 and 99, each of which is extended from a position close to one of sides, on which leads 94 and 95 are formed, to a position close to the other one of the sides, on which the leads 94 and 95 are formed, are formed through each of the first and second internal electrodes 92 and 93. These opened regions 98 and 99 induce the current flow as shown by the arrows in FIG. 5e, similar to that of FIG. 3b.

The arrangement of the opened regions of the present invention can be employed by a ten-terminal multilayered chip capacitor or a twelve-terminal multilayered chip capacitor as well as by the above-described eight-terminal multilayered chip capacitor.

As appreciated by those skilled in the art, in the ten-terminal multilayered chip capacitor or the twelve-terminal multilayered chip capacitor, 4 terminals are formed on each of opposite long sides, and 2 or 4 terminals are alternately formed on remaining opposite sides. Here, additional opened regions may be further formed on the remaining opposite sides close to the leads.

As apparent from the above description, the present invention provides a multilayered chip capacitor, in which at least one opened region is formed in leads or a position close to sides, on which the leads are formed, thereby precisely defining a current flow and reducing ESL. Since the opened region is formed through first and second internal electrodes such that the opened region formed in the first internal electrode corresponds to the opened region formed in the second internal electrode, the multilayered chip capacitor of the present invention is easily designed and solves problems caused by mismatching between the internal electrodes, compared to the conventional multilayered chip capacitor, which comprises internal electrodes having changed shapes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multilayered chip capacitor comprising:
   a capacitor main body including a plurality of dielectric layers, which are laminated;
   at least one pair of first and second internal electrodes, each of which is formed on the corresponding one of the plural dielectric layers and includes at least one lead extended to one end of the corresponding dielectric layer;
   a plurality of external terminals formed on the outer surface of the capacitor main body, and respectively connected to the first and second internal electrodes through the leads; and
   at least one opened region, formed through the inner area of each of the first and second internal electrodes, for branching the flow of current so as to increase the offset quantity of parasitic inductances between the first and second internal electrodes.

2. The multilayered chip capacitor as set forth in claim 1, wherein:
each of the first and second internal electrodes includes a plurality of the leads arranged on each of opposite two sides thereof in the same number so that the leads of the first internal electrodes alternate with the leads of the second internal electrodes; and
each of the first and second internal electrodes includes a plurality of the opened regions.

3. The multilayered chip capacitor as set forth in claim 2, wherein the plural opened regions are arranged on each of the opposite two sides of the first and second internal electrodes in the same number.

4. The multilayered chip capacitor as set forth in claim 3, wherein the opened regions are arranged in parallel with the opposite two sides of the first and second internal electrodes.

5. The multilayered chip capacitor as set forth in claim 2, wherein at least one of the plural opened regions is extended from a position close to one of the opposite two sides to a position close to the other one of the opposite two sides.

6. The multilayered chip capacitor as set forth in claim 1, wherein the directions of the flow of current, branched by the opened regions of the first internal electrodes, and the quantities of the branched flows of current of the opened regions of the first internal electrodes are the same as those of the opened regions of the second internal electrodes.

7. The multilayered chip capacitor as set forth in claim 6, wherein the opened regions formed through the first and second internal electrodes have the same sizes and are arranged in the same positions so that the opened regions of the first and second internal electrodes are overlapped.

8. The multilayered chip capacitor as set forth in claim 2, wherein each of the first and second internal electrodes includes at least one lead arranged on one of the other opposite two sides thereof.

9. The multilayered chip capacitor as set forth in claim 8, further comprising additional opened regions formed adjacent to the lead arranged on one of the other opposite two sides of the first and second internal electrodes.

10. The multilayered chip capacitor as set forth in claim 2, wherein the plural opened regions have the same shape and size.

11. The multilayered chip capacitor as set forth in claim 2, wherein the plural opened regions have rectangular shapes.

12. The multilayered chip capacitor as set forth in claim 3, wherein the plural opened regions have triangular shapes.

13. The multilayered chip capacitor as set forth in claim 12, wherein the triangular opened regions are arranged such that apexes of the opened regions face the sides of the first and second internal electrodes, on which the leads are formed.

14. The multilayered chip capacitor as set forth in claim 12, wherein the opened regions, apexes of which face the sides of the first and second internal electrodes, on which the leads are formed, and the opened regions, sides of which are parallel with the sides of the first and second internal electrodes, on which the leads are formed, are alternatively arranged.

* * * * *